US009708518B2

(12) United States Patent
Zhang et al.

(10) Patent No.: US 9,708,518 B2
(45) Date of Patent: Jul. 18, 2017

(54) OPTICAL TRANSPARENT DUAL CURE ADHESIVES COMPOSITION

(71) Applicants: Henkel AG & Co. KGaA, Duesseldorf (DE); Henkel IP & Holding GmbH, Duesseldorf (DE)

(72) Inventors: Rui Zhang, Shanghai (CN); Daoqiang Lu, Chandler, AZ (US)

(73) Assignees: Henkel AG & Co. KGaA, Duesseldorf (DE); Henkel IP & Holding GmbH, Duesseldorf (DE)

(*) Notice: Subject to any disclaimer, the term of this patent is extended or adjusted under 35 U.S.C. 154(b) by 0 days.

(21) Appl. No.: 14/874,915

(22) Filed: Oct. 5, 2015

(65) Prior Publication Data

US 2016/0024357 A1  Jan. 28, 2016

Related U.S. Application Data

(60) Division of application No. 14/628,770, filed on Feb. 23, 2015, now abandoned, which is a division of application No. 14/178,466, filed on Feb. 12, 2014, now abandoned, which is a continuation of application No. PCT/CN2012/079869, filed on Aug. 9, 2012.

(30) Foreign Application Priority Data

Aug. 12, 2011 (CN) .......................... 2011 1 0230724

(51) Int. Cl.

| C08G 61/04 | (2006.01) |
|---|---|
| C08F 2/46 | (2006.01) |
| C08F 2/50 | (2006.01) |
| C09J 175/16 | (2006.01) |
| C09J 109/00 | (2006.01) |
| C09J 175/14 | (2006.01) |
| C08F 222/10 | (2006.01) |
| C09J 133/06 | (2006.01) |
| C09J 133/14 | (2006.01) |
| C09J 4/06 | (2006.01) |

(52) U.S. Cl.
CPC ....... *C09J 175/16* (2013.01); *C08F 222/1006* (2013.01); *C09J 109/00* (2013.01); *C09J 133/06* (2013.01); *C09J 133/14* (2013.01); *C09J 175/14* (2013.01); *C09J 4/06* (2013.01)

(58) Field of Classification Search
CPC ...... C09J 175/16; C09J 109/00; C09J 133/14; C09J 4/06; C09J 175/14; C09J 133/06; C08F 222/1006; C08F 2220/1875; C08F 2220/281; C08F 2222/1086; C08F 2220/20
USPC .... 522/13, 12, 7, 8, 21, 22, 6, 189, 184, 71, 522/1; 520/1
See application file for complete search history.

(56) References Cited

U.S. PATENT DOCUMENTS

| 4,309,526 A | 1/1982 | Baccei |
|---|---|---|
| 4,380,613 A | 4/1983 | Nativi |
| 4,439,600 A | 3/1984 | Moran |
| 4,574,138 A | 3/1986 | Moran et al. |
| 4,605,465 A * | 8/1986 | Morgan ................ B32B 37/12 156/273.3 |
| 4,652,398 A | 3/1987 | Goswami et al. |
| 5,696,209 A | 12/1997 | King et al. |
| 5,997,682 A | 12/1999 | Goodman et al. |
| 6,479,563 B1 * | 11/2002 | Liebing ..................... C09J 4/06 156/275.5 |
| 6,520,663 B1 | 2/2003 | Holmes et al. |
| 6,881,964 B2 | 4/2005 | Holmes |
| 7,687,551 B2 | 3/2010 | Mgaya et al. |
| 7,688,551 B2 | 3/2010 | Kido et al. |
| 2003/0036017 A1* | 2/2003 | Tanizaki .................. G03F 7/11 430/271.1 |
| 2007/0299226 A1 | 12/2007 | Park et al. |
| 2010/0288431 A1 | 11/2010 | Bossaert et al. |
| 2011/0021655 A1 | 1/2011 | Smothers et al. |
| 2013/0295337 A1* | 11/2013 | Busman ................ G02F 1/1303 428/174 |
| 2014/0142210 A1 | 5/2014 | Zhang et al. |

FOREIGN PATENT DOCUMENTS

| CN | 101314629 A | | 12/2008 |
|---|---|---|---|
| CN | 102898958 A | | 1/2013 |
| JP | S62243673 A | | 10/1987 |
| JP | 2004-161935 | * | 6/2004 |
| JP | 2008519137 A | | 6/2008 |
| JP | 2011500902 A | | 1/2011 |
| WO | 2010-027041 | * | 3/2010 |
| WO | 2010027041 A1 | | 3/2010 |
| WO | 2010111316 A2 | | 3/2010 |
| WO | 2012-036980 | * | 3/2012 |

(Continued)

OTHER PUBLICATIONS

Ida et al, JP 2004-161935 Machine Translation, Jun. 10, 2004.*
Cray Valley, Ricon 130, Jan. 2010, http://www.crayvalley.com/docs/technical-paper/ricon-130-maleinized-polybutadiene.pdf, 1.*
Kuraray, UC-203, Jul. 2011, http://www.kurarayliquidrubber.com/pdf/download_pdf_23.pdf, 2.*
Kuraray, UC 102, Jul. 2011, http://www.kurarayliquidrubber.com/english/pdf/download_pdf_22.pdf, 2.*
Rayson L. Huang et al., The Chemistry of Free Radicals, 1974, 244 pages.
Harry R. Allcock et al., Contemporary Polymer Chemistry.
ASTM D1005-1995 (replacement for D1005-1997—rescinded by ASTM)—Standard Test Method for Measurement of Dry-Film Thickness of Organic Coatings Using Micrometers; 3 pages.

(Continued)

*Primary Examiner* — Jessica E Whiteley
(74) *Attorney, Agent, or Firm* — James E. Piotrowski

(57) ABSTRACT

The present invention relates to an optical transparent dual cure adhesive, and process for preparing this dual cure adhesive, and uses thereof. More particularly, the present invention relates to optical transparent adhesive, which is both capable of being UV-light cured and thermal cured, for example, it can be used for the bonding of touch screen of an electronic device and substrate.

9 Claims, No Drawings

(56) References Cited

FOREIGN PATENT DOCUMENTS

WO      2012036980 A2     3/2012
WO      2013013598 A1     1/2013

OTHER PUBLICATIONS

ASTM D1086-64 (replacement for D1086-997—rescinded by ASTM), Measuring the Temperature of Petroleum and Petroleum Products, 8 pages.

* cited by examiner

OPTICAL TRANSPARENT DUAL CURE ADHESIVES COMPOSITION

The present invention relates to an optical transparent dual cure adhesive composition, and process for preparing the dual cure adhesive composition, and uses thereof. More particularly, the present invention relates to optical transparent adhesive composition, which is both UV curable and thermal curable. For example, it can be used for the bonding of touch screen and substrate of an electronic device.

UV curable (abbreviated as UV cure) adhesives were reported in the 1960s, since then considerable achievements were achieved through an extensive research. UV cure adhesives refer to adhesives that may cure rapidly under UV radiation. Today, UV cure adhesives have been successfully applied in many fields of industrial assembly, especially high-tech industries where fast assembly is required, such as liquid crystal display (LCD) manufacturing, cameras and other optical products manufacturing, CD manufacturing, watch-making industry, mobile phone keypad assembly, electronic circuit board manufacturing, electronic components manufacturing in optoelectronic information industry such as manufacturing of the polarized components. UV cure adhesives are also widely used in the commodity sector, such as the manufacturing of glass furniture, assembly of glass crafts, assembly of toys, jewelry and other decorations, since a high and efficient productivity can thus be achieved.

For example, Zhang Nanzhe and Xu Sulian reported "Application of UV curable adhesive in manufacturing of LCD" (*Journal of Changchun University of Science and Technology*, 2005(4)), where the application of UV curable adhesives in manufacturing of liquid crystal displays (LCD) as well as the technical requirements were studied.

In adhesion of touch screen components and substrate of LCD products, for example, 3M Innovative Properties Company filed a PCT application WO 2010/111316 A2 on Mar. 24, 2010. WO 2010/111316 A2 is directed to an optical assembly having a display panel, wherein an adhesive layer or adhesive composition is used as the display panel, so that the display panel is bonded to the substantially transparent substrate. The adhesive layer comprises the reaction product of a multifunctional (meth)acrylate oligomer, a reactive diluent comprising a monofunctional (meth)acrylate monomer; and a plasticizer, wherein the reaction product in the adhesive layer can be obtained by initiating polymerization using UV-photoinitiators.

However, in some specific application fields using the conventional UV curable adhesives, some problems may be encountered. For example, shadow areas may exist between the liquid crystal panel and the substrate, that is, areas that light cannot transmit or penetrate, UV/visible light cannot transmit through these areas, thus the adhesives cannot be cured completely, and may cause problems such as corrosion, aging fatigue or peeling of unbonded edges. Generally, the shadow areas are for example the edge areas where ink coatings exist, and etc.

Since the current commercial available UV-curable adhesive could not meet above demands, there is a need, therefore, to overcome such defects.

One solution to above problems is to combine adhesives having different cure mechanisms, such as dual cure mechanism adhesive.

As to dual cure mechanism adhesive, for example, the following types of adhesive compositions were reported:

In U.S. Pat. No. 7,688,551B2 (the contents thereof are incorporated here by reference), Alexander P. Mgaya et al propose a dual cure mechanism adhesive, wherein one cure mechanism is based on the drying of the adhesive, which is mainly due to the evaporation of water or other volatile substances in emulsion of adhesive components; the other cure mechanism is UV or visible light irradiation. This adhesive has the following components: a water-based emulsion; (meth)acrylate functionalized monomer capable of polymerizing or crosslinking; and at least one UV-photoinitiator; wherein said water based emulsion is cured or crosslinked by water evaporation/coagulation.

In addition, in U.S. Pat. No. 5,997,682 (the contents thereof are incorporated here by reference), Daniel L. Gooman et al propose a phase-separated dual-cure elastomeric adhesive formulation, characterized in that the dual cure elastomeric adhesive is E-beam cured and heat cured at relatively low temperature; this adhesive can be used for bonding structure which is thick or has irregular shapes, for example, the structural parts in automobile or aeroplane having irregular shapes. This adhesive mainly comprises: urethane acrylate oligomer sensitive to irradiation; reactive dilute sensitive to irradiation; hydroxy group containing compounds, such as saturated polyol; compounds containing isocyanate functional group, such as polyisocyanate, or urethane prepolymer. This patent proposes to rotate the structure to be bonded, and e-beam irradiation is conducted for two or more times and heat cure is conducted at relatively low temperature for a certain period of long time, so as to cure the adhesive completely.

In U.S. Pat. No. 5,696,209 (the contents thereof are incorporated here by reference), Russell K. King et al propose dual cure silicone adhesive composition, which is solventless dual cure organosilicon adhesive, flowable or extrudable at room temperature. The adhesive is first reacted by addition to cure into viscous and sticky state; then it is condensed to cure slowly (moisture cure), obtaining non-flowable bonded body with high bonding strength. This patent further proposes moisture cure the addition cured product, to form a permanent cured body.

In U.S. Pat. No. 4,605,465 (the contents thereof are incorporated here by reference), Charles R. Morgan et al propose a composition containing thermoplastic material which is UV curable and also thermal curable; wherein the disclosed adhesive composition comprises:

Liquid ethylenically unsaturated monomer, prepolymer or polymer having the following repeating unit of:

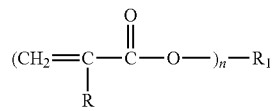

wherein thermal initiator, UV-photoinitiator, thermoplastics, for example, vinyl resin, such as PVC, PVDC, and PS; un-polymerizable plasticizer are used; and the thermoplastics is in the form of dispersion in the plasticizer, wherein the use of thermoplastics and plasticizer cause the unsaturated monomer, prepolymer or polymer having acrylate group would not lead to a sticky surface upon UV irradiation. Optional component includes reactive dilute, such as monofundional acrylate, and the heating step requires a condition of at least 80° C., preferably 80-200° C., so as to obtain a full cure product.

However, all above dual cure adhesives could not be used to solve the problem of the present invention, i.e., when shadows exist between the touch screen and substrate, that is, portions or areas that light or rays could not penetrate, adhesive can not be cured completely, which in turn leads to problems, such as corrosion, aging fatigue or peeling of unbonded portions.

Therefore, it is an object of the invention to provide an optical transparent dual cure adhesive composition, which should be able to solve all the above problems.

A first subject matter of the present invention is an optical transparent dual cure adhesive composition, based on the total weight of the adhesive composition, the composition comprises:

10-90 wt % of photo curable oligomer or polymer having (meth)acryloxy group or vinyl group;
5-55 wt % of (meth)acrylate;
0-50 wt % of liquid polybutadiene;
0.5-5 wt % of UV-photoinitiator; and
0.5-5 wt % of thermal initiator.

In another aspect of the invention, there is provided an optical transparent dual cure adhesive composition, based on the total weight of the adhesive composition, the composition comprises:

40-90 wt % of urethane oligomer having (meth)acryloxy group;
5-55 wt % of (meth)acrylate;
0.5-5 wt % of UV-photoinitiator; and
0.5-5 wt % of thermal initiator.

In another aspect of the invention, there is provided an optical transparent dual cure adhesive composition, based on the total weight of the adhesive composition, the composition comprises:

10-80 wt % of polyisoprene having (meth)acryloxy group or vinyl group;
10-55 wt % of (meth)acrylate;
0-50 wt % of liquid polybutadiene,
0.5-5 wt % of UV-photoinitiator, and
0.5-5 wt % of thermal initiator.

In another aspect of the invention, there is provided a process for preparing the adhesive composition as mentioned above, comprising the steps of:

under the condition of darkness, according to a predetermined ratio, feeding each components of an adhesive composition into the mixing container; conducting mixing under agitation for a sufficient time, so as to homogenize each components; thus obtaining the adhesive composition.

Another aspect of the invention also relates to the uses of the adhesive composition for bonding a touch screen and substrate of an electronic device.

The term "cure" or "curing" as used herein refers to a change in state, condition, and/or structure in a material that is usually, but not necessarily, induced by at least one variable, such as time, temperature, moisture, radiation, presence and quantity in such material of a cure catalyst or accelerator, or the like. The terms cover partial as well as complete cure. For purposes of the present invention, the terms mean at least partially crosslinked, and in more preferred embodiments substantially or fully crosslinked.

The term "dual cure" used herein refer to UV cure induced by using UV-photoinitiator as well as thermal cure induced by using thermal initiator, the UV light cure refers to a cure under the irradiation of UV light for a certain period of time, and the thermal cure refers to a cure under certain temperature for a certain period of time.

Unless stated otherwise, all percentages, parts, ratios, etc., are by weight.

Unless otherwise defined, all technical and scientific terms used herein have the same meaning as commonly understood by one of ordinary skill in the art to which this invention belongs. In case of conflict, the present specification, including definitions, will control.

When an amount, concentration, or other value or parameter is given as either a range, preferred range or a list of lower preferable values and upper preferable values, this is to be understood as specifically disclosing all ranges formed from any pair of any lower range limit or preferred value and any upper range limit or preferred value, regardless of whether ranges are separately disclosed. Where a range of numerical values is recited herein, unless otherwise stated, the range is intended to include the endpoints thereof, and all integers and fractions within the range.

Hereafter, technical terms or expressions involved in preferred embodiments will be described, in which the embodiments are just for the purpose of illustrating the present invention rather than limiting the present invention.

"Photo curable oligomer or polymer having (meth)acryloxy group or vinyl group" is a functionalized oligomer or polymer, on the molecular chain thereof, there exists (meth)acryloxy group or vinyl group reactive to UV light irradiation. These oligomer or polymer is a polymer preferably having low to medium molecular weight, for example, usually said functionalized oligomer or polymer can have number average molecular weight of about 300 to about 50000 Daltons, preferably 800-40000 Daltons, more preferably 1000-35000 Daltons, more preferably 3000-25000 Daltons, more preferably 5000-20000 Daltons. Said (meth)acryloxy and/or vinyl functional group could be located at the end(s) of the polymer chain, or may be distributed along the polymer chain thereof. The functional group(s) on said functionalized oligomer or polymer chain curable by irradiation preferably have average degree of functionality of more than 0 to less than or equal to 3, especially from 0.5 to 2.5. Herein the term "average degree of functionality" refers to the average number of (meth)acryloxy group or vinyl functional group per macromolecular chain.

The non-limited but preferred examples of said oligomer or polymer include (meth)acryloxy group functionalized urethane oligomer, such as (meth)acryloxy group functionalized polyether urethane, and (meth)acryloxy group functionalized polyester urethane, polyisoprene having (meth)acryloxy group or vinyl group and the like. These oligomer or polymer and preparation thereof are known in art, for example, please refer to the disclosures in U.S. Pat. Nos. 4,574,138, 4,439,600, 4,380,613, 4,309,526, their entire contents are incorporated here by reference.

Based on the total weight of the adhesive composition, the adhesive composition contains 10-90 wt % of said functionalized photo curable oligomer or polymer, preferably 20-85 wt %, more preferably 30-70 wt %.

The structure of (meth)acryloxy group is $CH_2\!\!=\!\!CRC(O)O\text{---}$, wherein R is H or $CH_3$. The term "(meth)acryloxy group" represents acryloxy, methacryloxy group or their combination; the term "(meth)acrylic acid" represents acrylic acid, methacrylic acid or their combination; the term "(meth)acryl" represents acryl, methacryl or their combination, and so on.

"Urethane oligomer having (meth)acryloxy group" is a specific and non-limited but preferred example of the photo curable oligomer or polymer having (meth)acryloxy group or vinyl group, which is an urethane oligomer having (meth)acryloxy group, and sometimes it is also referred to as urethane(meth)acrylate oligomer.

The urethane oligomer having (meth)acryloxy group preferably has an average degree of functionality of more than 0 and equal to or less than 3; more preferably 0.5-2.5.

The urethane oligomer having (meth)acryloxy group preferably has a number average molecular weight of 1000-25000 Daltons, more preferably 1500-10000 Daltons, even more preferably 2000-8000 Daltons.

The urethane oligomer having (meth)acryloxy group in accordance with the present invention preferably has a $T_g$ of from −80 to 0° C., more preferably from −60 to 0° C. Said urethane oligomer having (meth)acryloxy group preferably has a Brookfield viscosity of 1000 centipoise (cps) to 190000 cps, more preferably from 2000 cps to 150000 cps; even more preferably from 5000 to 100000 cps at a temperature of 25° C. at a shear rate of 2.55 $s^{-1}$, measurable by HAAKE Rotational Rheometer with a cone plate (35 mm diameter).

Useful and preferred urethane oligomer having (meth) acryloxy group includes commercially available products, for example, said urethane oligomer may preferably include: urethane diacrylate CN9018, CN9021, CN3108, CN3211, CN8004 commercially available from Sartomer, Co., Exton, Pa.; GENOMER 4188/EHA (mixture consisting of 80 wt. % of a monoacrylate-functional polyesterbased oligomer comprising at least one urethane bond, and 20% 2-ethylhexyl acrylate monomers; the oligomer comprised by GENOMER 4188 has a weight average molecular weight Mw of about 8,000), GENOMER 4188/M22 (mixture of GENOMER 4188 and GENOMER 1122 monomers), GENOMER 4256 and GENOMER 4269/M22 (mixtures of GENOMER 4269 and GENOMER 1122 monomers), commercially available from Rahn USA Corp., Aurora Ill., and etc.

Usually, the amount of said urethane oligomer having (meth)acryloxy group used in the adhesive composition of the present invention depends from the amounts of the other components used for forming the adhesive composition, and the desired properties of the adhesive composition. The adhesive composition may include about 40-90 wt % of the urethane oligomer having (meth)acryloxy group, preferably from about 45-85 wt %, more preferably 50-80 wt %, more preferably 60-70 wt %.

Most specifically, examples of the urethane acrylate oligomer used in the present invention include, for example CN9018, CN9021, CN3108, CN3211, CN8004 from Sartomer Company, Inc.

According to the present invention, the urethane oligomer having (meth)acryloxy group may be used alone or in any desired combination of several urethane oligomers having (meth)acryloxy group; the specific types and combination thereof depend from the desired properties of the products.

"Polyisoprene having (meth)acryloxy group or vinyl group": Another non-limited example of photo curable oligomer or polymer having (meth)acryloxy group or vinyl group is polyisoprene having (meth)acryloxy group or vinyl group.

Generally, this is an isoprene polymer modified by reactive functional groups, for example, polyisoprene grafted with acrylate group, or polyisoprene grafted with vinyl groups. Wherein the backbone or main chain of the macromolecule polyisoprene may have a number average molecular weight of 10000-50000 Daltons, preferably 12000-40000 Daltons; more preferably 15000-35000 Daltons. As to the grafted reactive groups, this exemplified acrylate functional group or vinyl functional group may be located at the end(s) of the isoprene oligomer, or may be pendant to branches of isoprene oligomer.

The polyisoprene having acryloxy or vinyl functional group used in accordance with the present invention may have a Brookfield viscosity, at a temperature of 25° C. at a shear rate of 2.55 $s^{-1}$, several thousands to tens of thousands cps, for example 10000-100000 cps, or 15000-80000 cps, or 25000-60000 cps, measurable by HAAKE Rotational Rheometer with a cone plate (35 mm diameter).

Specifically, the non-limited examples of polyisoprene having acryloxy or vinyl functional group are as follows: polyisoprene UC203, UC102, commercially available from KURARAY CO., LTD, and the like.

In the adhesive composition in accordance with the present invention, polyisoprene having acryloxy or vinyl functional group can be used in at an amount of 10-80 wt %, preferably 20-70 wt %, more preferably 30-60 wt %.

According to the present invention, in the adhesive composition, polyisoprene having acryloxy or vinyl group may be used alone or in any combination of several polyisoprenes having acryloxy or vinyl group. The specific types and combination thereof depend from the desired properties of the adhesive products.

"(Meth)acrylate": The adhesive composition in accordance with the present invention also makes use of (meth) acrylate. Said (meth)acrylate is, for example, aliphatic alkyl (meth)acrylate, and (meth)acrylate having epoxy function, and the like. It could be a monofunctional (meth)acrylate, i.e., there is only one (meth)acrylate group within its molecule, it could also be a multifunctional (meth)acrylate, i.e., it is a (meth)acrylate having two or more than two (meth) acrylate group within its molecule.

The (meth)acrylate monomer preferably is monofunctional- and multifunctional alkyl(meth)acrylates, monofunctional- and multifunctional alkenyl(meth)acrylates, and monofunctional- and multifunctional heterocyclo(meth) acrylates. Said alkyl moiety preferably is an alkyl group having from 1 to 20 carbon atoms, which may further have one or more substituents selected from an alkyl group having from 1 to 20 carbon atoms, an alkoxy group having from 1 to 20 carbon atoms, an aryloxy group having from 6 to 20 carbon atoms, an epoxy group having from 2 to 20 carbon atoms, hydroxyl and the like. The alkenyl moiety preferably is an alkenyl group having from 2 to 20 carbon atoms, which may further have one or more substituents selected from an alkyl group having from 1 to 20 carbon atoms, an alkoxy group having from 1 to 20 carbon atoms, an acryloxy group having from 6 to 20 carbon atoms, an epoxy group having from 2 to 20 carbon atoms, hydroxyl and the like. The heterocyclic group preferably is a heterocyclic group having from 2 to 20 carbon atoms, and having a hetero atom selected from nitrogen and oxygen. The heterocyclic group may have one or more substituents selected from an alkyl group having from 1 to 20 carbon atoms, an alkoxy group having from 1 to 20 carbon atoms, an aryloxy group having from 6 to 20 carbon atoms, an epoxy group having from 2 to 20 carbon atoms, hydroxyl and the like.

Preferred examples of monofunctional acrylate component are isobornyl(meth)acrylate, tetrahydrofurfuryl(meth) acrylate, alkoxylated tetrahydrofurfuryl(meth)acrylate, and mixtures thereof.

Preferred examples of multifunctional acrylate component are: ethylene glycol di(meth)acrylate, 1,6-hexanediol di(meth)acrylate, 1,4-butanediol di(meth)acrylate, pentaerythritol tri(meth)acrylate. pentaerythritol tetra(meth) acrylate, trimethylolpropane(meth)acrylate, tetraethylene glycol di(meth)acrylate and the like, and mixture thereof.

Preferably said (meth)acrylate is selected from the group consisting of: methyl(meth)acrylate, ethyl(meth)acrylate, butyl(meth)acrylate, 2-(2-ethoxyethoxy)ethyl acrylate, tetrahydrofurfuryl(meth)acrylate, lauryl acrylate, isooctyl acrylate, isodecyl acrylate, 2-phenoxy ethyl acrylate, 2-ethylhexyl(meth)acrylate, isobornyl(meth)acrylate, dicyclopentenyloxyethyl(meth)acrylate, dicyclopentadienyl(meth)acrylate, 2-hydroxyethyl(meth)acrylate, 2-hydroxypropyl(meth)acrylate, 2-hydroxybutyl(meth)acrylate, caprolactone acrylate, morpholine(meth)acrylate, hexanediol di(meth)acrylate, ethylene glycol di(meth)acrylate, trimethylolpropane tri(meth)acrylate, pentaerythritol tetrahydrofuran (meth)acrylate, hydroxylpropyl(meth)acrylate, ethylene glycol dicyclopentenyl ether(meth)acrylate, and any combination thereof.

Most preferably used (meth)acrylate monomers are selected from the group consisting of: isobornyl acrylate, hydroxypropyl acrylate, 2-(2-ethoxyethoxy)ethyl acrylate. ethylene glycol dicyclopentenyl ether methacrylate, and combination thereof.

Usually, the amount of (meth)acrylate component would depend from the amounts of other components used for forming the adhesive composition, and the desired properties of the adhesive composition. In the embodiments of adhesive composition of the present invention, based on the total weight of adhesive weight, the contents of (meth)acrylate in the adhesive composition is 5-55 wt %; preferably 10-55 wt %, more preferably 10-50 wt %, more preferably 20-45 wt %; more preferably 25-40 wt %, and most preferably 20-40 wt %.

"Photoinitiator": According to the present invention, the adhesive composition comprises photoinitiator. Said photoinitiator may include UV-photoinitiator and visible light photoinitiator.

In the context of the present invention, said photoinitiator preferably refers to UV-photoinitiator. UV-photoinitiator is well known in the art, and can be used to initiate the photo polymerization of all the above functionalized photo curable oligomer, polymer having (meth)acryloxy group or vinyl group.

A variety of UV photoinitiators may be employed. UV photoinitiators are generally effective in the wavelength range of 200 to 400 nm, and particularly in the portion of the spectrum that borders on the invisible light and the visible portion just beyond this spectrum, e.g. from >200 nm up to about 390 nm. Examples thereof may be benzyl ketal, hydroxy ketone, amino ketone, acyl phosphine oxide, and the like.

Photoinitiators that will respond to UV radiation to initiate and induce cure of the (meth)acrylate functionalized curable component, which are useful in the present invention include preferably benzophenone and substituted benzophenones, acetophenone and substituted acetophenones, benzoin and its alkyl esters, diethoxy acetophenone, benzoin methyl ether, benzoin ethyl ether, benzoin isopropyl ether, N-methyldiethanolamine benzophenone, 2-hydroxymethyl-1-phenylpropan-1-one, 2-benzyl-2-(dimethylamino)-1-[4-(4-morpholinyl)phenyl]-1-butanone, diphenyl (2,4,6-trimethylbenzoyl) phosphine oxide, and combination thereof.

According to the present invention, the UV-photoinitiator may be used alone, or in any desired combination thereof. Above UV-photoinitiators are just for purpose of illustration, rather than limiting the UV-photoinitiator useful in the present invention.

The amount of UV-photoinitiator used, based on the total weight of the adhesive composition, may be 0.5-5 wt %, preferably 1-4 wt %, more preferably 2-3 wt %.

"Thermal Initiator": In the adhesive composition according to present invention, thermal initiator is to be used to initiate the polymerization and cure of the composition. Thermal initiator usually includes azo compounds, peroxides, and other thermal initiator(s) well known to those skilled in the art, which is capable of releasing radicals under heating conditions, and combination thereof. Preferably peroxides are used in the present invention. The peroxide useful in the present invention preferably includes organic peroxide and inorganic peroxide. Non-limited examples of organic peroxide may be peroxy-dicarbonate, for example di(2-ethylhexyl)peroxydicarbonate; acyl peroxide, for example, dilauroyl peroxide; alkyl peroxide, for example 2,5-dimethyl-2,5-di(tert-butylperoxy)hexane; peroxyesters, for example tert-butyl peroxybenzoate, and the like.

Inorganic peroxide is also well known in the art, and non-limited examples of organic peroxide may be persulfate, for example, potassium persulfate, sodium persulfate and ammonium persulfate, and the like.

In the adhesive composition of the present invention, peroxide thermal initiator may be used alone, or two or even more peroxides may be used together.

In the adhesive composition of the present invention the thermal initiator preferably used is organic peroxide, particularly peroxy esters, and the preferred example thereof is tert-butyl peroxybenzoate, as well as alkyl peroxide, the non-limited example thereof is 1,1-di(tert-butyl peroxy)-3, 3,5-trimethyl cyclohexane.

The amount of the ester peroxide and alkyl peroxide used, based on the total weight of the adhesive composition, is 0.5-5 wt %, preferably 1-4 wt %, more preferably 2-3 wt %.

"Liquid Polybutadiene": In accordance with the present invention, the adhesive composition may optionally include liquid polybutadiene component. Preferably, the liquid polybutadiene here is an oligomer of butadiene, i.e., it is a product obtainable by anion polymerization or coordination polymerization, and the degree of polymerization, or the molecular weight thereof or viscosity thereof may be controllable by adjusting the initiator, the amount thereof, the chain transfer agent, the amount thereof, and etc.

The liquid polybutadiene may have a number average molecular weight of 1000-30000 Daltons, preferably 1500-25000 Daltons, more preferably 2000-20000 Daltons, more preferably 3000-10000 Daltons; and the Brookfield viscosity thereof at 25° C. at a shear rate of $2.55s^{-1}$ may be hundred cps to tens of thousands cps, for example 500 cps-50000 cps, preferably 1000 cps-30000 cps, more preferably 3000 cps-20000 cps, still more preferably 5000 cps-15000 cps, measurable by HAAKE Rotational Rheometer with a cone plate (35 mm diameter).

The liquid polybutadiene useful in the present invention may be those commercially available products, and the non-limiting examples thereof may be: Polybutadiene Ricon 130, Ricon156, LBR307, LBR305 and etc commercially available from Sartomer Company, Inc.; wherein Polybutadiene Ricon 130 has a number average molecular weight of about 2500; and Polybutadiene Rican 156 has a number average molecular weight of 1400; or Polybutadiene LBR307, LBR305 commercially available from KURARAY CO., LTD; the number average molecular weight thereof are about 8000 and 26000, respectively.

Most preferably, the liquid polybutadiene is selected from the group consisting of: PB-3600 from Daicel Chemical co., and Ricon130 polybutadiene from Sartomer Company, Inc.

In the adhesive composition of the present invention, based on the total weight of the adhesive composition, the amount of liquid polybutadiene used may be 0-50 wt %, preferably 10-40 wt %, more preferably 20-35 wt %.

"Other Components": In addition to above components, the adhesive composition according to the present invention may optionally contain other additives well known to those skilled in the art, for example, non limiting to: light stabilizer, thermal stabilizer, promoter to photo initiation, promoter to thermal initiation, level agent, toughening agent, thickening agent, and etc.

Based on the total weight of said adhesive composition, said additives may account for 0.01-1 wt %, or 1%-2 wt %, or 0-2 wt %.

"Substrate to be bonded": The present inventive adhesive composition is particularly suitable for bonding touch screen and substrate of electronic devices. Non-limited examples of the electronic devices include mobile phone, television, palm PDA, notebook, table PC, and other devices having a touch screen. The touch screen may be any type of panel in the art, for example, liquid crystal display panel, plasma display panel, and organic electroluminescent panel, and the like.

The substrate may be any type in the art as well, generally it includes glass or polymeric material. Useful glass comprises, but not limiting to, borosilicate glass, soda-lime glass, and any other glasses suitable for display screen. Useful polymeric material includes polyester film, for example polyethylene terephthalate PET, polycarbonate film or polyacrylate film, for example, polymethyl methacrylate film, and cycloolefin polymeric film, for example, ZEONOX and ZEONOR from Zeon Chemicals L. P. Said substrate preferably has a reflective index comparable with those of display screen, for example, from about 1.4 to about 1.7. Typical thickness of substrate may be about 0.5 to about 5 mm.

"Production of Adhesive": The adhesive composition in accordance with the present invention may be prepared as follows: into a mixing container with conventional stirring means, under the condition of substantially complete darkness, in a predetermined ratio, each components of the adhesive composition are fed into and mixed. Mixing is usually conducted at ambient temperature, or a temperature slightly higher or lower than ambient temperature. Mixing should last for a sufficient time to ensure a uniformly dispersed components, thus obtaining the adhesive composition. Store the thus obtained adhesive composition in dark environment, for subsequent bonding between touch screen and substrate.

The volume of the mixing container is not specifically defined, per specific requirements, it could be, for example, about 1-100 L, or 5-50 L, or 10-30 L, and etc. The mixing container could be such as those commercially available; with a conventional stirring means, such as, paddle stirrer, anchor stirrer, propeller stirrer and the like, the speed of rotation generally depends from the type of the stirrer and the viscosity of adhesive components, and etc. For example. It could be 10 rpm-500 rpm, or 50 rpm-300 rpm, or rotor-stator stirrer may also be adopted, with a speed of rotation of, for example, 300-4000 rpm, preferably 1500-3000 rpm. For example, the mixing time could be about 1-10 minutes, or 2 to 8 minutes, or 4-6 minutes and etc; thus obtaining the adhesive composition.

"UV Cure": After the touch screen and substrate is bonded with the adhesive composition in accordance with the present invention, the bonded assembly should be cured. As to the UV cure of the bonded assembly, UV source covering the range of 200 nm-400 nm wavelength could be adopted, for example, with an irradiation power of 100 mW/cm$^2$. Per specific requirements, irradiation could be conducted for seconds to tens of seconds, for example 5-30 seconds, or even longer. The irradiation power and time could be easily determined by those skilled in the art per the requirements of products.

The present invention may take use of commercially available lamp assembly, including an arc lamp, for example, please refer to those disclosed in U.S. Pat. Nos. 6,520,663 and 6,881,964, the contents thereof are incorporated here by reference. UV cure oven may also be adopted, for example, Loctite UVALOC 1000 from Henkel AG.

"Thermal Cure": After UV cure, the bonded sample will be further thermal cured. Thermal cure may be conducted by any conventional means in the art without any limitation. For example, it may be performed by using an oven with a hot air circulating oven with adjustable temperature controller. The specific thermal cure temperature may be, for example 50-150° C., or 60-140° C., 70-120° C., most preferably 80-90° C. The time of thermal cure depends on the specific adhesive composition, for example, in case of high content of thermal initiator, cure time could be relatively short, such as 30 minutes to 1.5 hours, and in case of low content of thermal initiator, cure time could be relatively long, such as 1-3 hours.

"Testing Methods involved in the present invention": In accordance with the present invention, specifically, testing methods involved are described as follows:

1. Viscosity: Viscosity is used to describe the flowing resistance of a liquid, and in principle, it reflects the inner molecular friction. In the present invention, the testing instrument used to measure the viscosity of uncured adhesive composition may be commercially available Brookfield rotating viscosity meters, and testing temperature is ambient temperature (about 25° C.), or room temperature, or 60° C. and etc., and the testing may preferably be performed per the specification in ASTM D1086-1997. The unit of viscosity is poise or centipoise. Preferably, viscosity is measured at 25° C. at a shear rate of $2.55s^{-1}$ by HAAKE Rotational Rheometer with a cone plate (35 mm diameter).

2. Light Transmittance: Light transmittance is an index to describe the transmission of light through a material, typically, it is expressed as a ratio of intensity of transmissive light $I_t$ to intensity of incident light $I_0$. After complete cure, the testing of light transmittance of the adhesive composition may typically measured by conventional commercially available UV light spectrophotometer. The thickness of the two pieces of testing samples adopted in the adhesive composition may be controlled in a certain range, for example, about 100 μm.

Testing of light transmittance may preferably be conducted according to the specification in ASTM D1005-2007.

Preferably an adhesive is regarded as optically transparent, if it exhibits an optical transmission of at least 85%.

3. Bonding Strength: Bonding strength is used to characterize the joining strength between two pieces of bonded materials, after the bonding between the samples are sufficiently cured.

The thickness of the adhesive coating generally is controlled per specific requirements, such as at about 100 μm. Substrate may be selected, per requirements, as glass sheet, acrylate resin sheet, or polyester sheet. In the present testing, the size of glass substrate sample is typically of 100 mm long, 10 mm wide and 2 mm thick.

Testing equipment for bonding strength may preferably be an universal tensile machine, the mode thereof may be, for example, Instron 5569 from Instron Inc.

For example, the procedure for measuring the bonding strength is, for example, as follows: dropping the adhesive to be tested in one of the center of a piece of glass sheet, copper wire having 100 um in diameter is disposed at two sides of the adhesive for the purpose of controlling the thickness thereof. Then another piece of glass is lapped vertically above the adhesive, forming a lapping sample in cross form. The lapped sample is further put into a UV cure oven (for example, Loctite UVALOC 1000, Henkel AG) to carry out UV cure. Predetermined condition is: irradiation for 30 seconds, the power thereof is 100 mW/cm$^2$.

The cured sample is further placed at room temperature for 24 hours, then universal tensile machine is used to tensile the bonded sample vertically in opposed direction. The tensile speed may be set as 2 inches/min. The bonding strength (unit: MPa) could be obtainable via dividing the value of force recorded in the machine by the lapping area.

4. Molecular Weight: Molecular weight of the starting materials of the adhesive composition includes number average molecular weight, weight average molecular weight, and the like. Unless indicated otherwise, measurement of said molecular weight is conducted by using gel permeation chromatography (GPC) well known and widely adopted in the relevant art. In the measurement, polystyrene having a narrow molecular weight distribution may be used as standard, for example, and tetrahydrofuran may be used as the mobile phase, and the flowing speed, for example, may be 0.8 mL/min, and the column temperature for example, may be 35° C.

EXAMPLES

Hereafter examples are provided to further describe the present invention, said examples are only for illustration to the present invention; rather, it should not be construed as a limitation to the present invention.

Specific Testing Conducted in Examples

Test 1: UV Cure Experiment

At room temperature, a UV light source covering the emitting wavelength of 200 nm~400 nm, having an irradiation power of 100 mW/cm$^2$ was used to irradiate the boding of adhesive composition between glass and polycarbonate (PC) sheets for 30 seconds.

Test 2: Thermal Cure Experiment

Under the condition of darkness, in an oven with an adjustable temperature controller, the highest temperature thereof was no less than 200° C., the adhesive composition between glass and PC sheets was thermal cured. The cure time depended on specific components of the adhesive composition.

Test 3: Bonding Strength Experiment

In the present invention, under the condition of 100 mW/cm$^2$ UVA irradiation, the adhesive composition between glass sheet and glass sheet was cured for 30 seconds, and according to the above mentioned testing method, the bonding strength of the adhesive composition was measured.

Test 4: Light Transmittance Experiment

An UV light-visible light spectrophotometer was adopted to measure the light transmittance of the adhesive material after curing. The thickness of the cured adhesive material was controlled at about 100 μm. Testing method was per the specification of ASTM D1005-2007. After the irradiation of 100 mW/cm$^2$ UVA for the adhesive composition between glass and glass sheets for 30 seconds, the light transmittance of the adhesive composition was measured accordingly.

Test 5: Shadow Area Checking

Kept the area applied by adhesive composition or the lapped area between the testing sheets in complete darkness. After such an arrangement, thermal cure of the adhesive composition was conducted. After the thermal cure testing condition was met, checked the results of the body to be bonded.

| Raw materials used | |
|---|---|
| Components | Products |
| urethane oligomer having (meth)acryloxy group 1-1 | Genomer 4188/EHA (Rahn AG): mixture consisting of 80 wt. % of a monoacrylate-functional polyesterbased oligomer comprising at least one urethane bond, and 20% 2-ethylhexyl acrylate monomers; the oligomer comprised by GENOMER 4188 has a weight average molecular weight Mw of about 8,000, average degree of functionality about 1, viscosity at 25° C.: about 70000 cps, Tg: about −3° C. |
| urethane oligomer having (meth)acryloxy group 1-2 | CN 9021 (Sartomer Company, Inc.), average degree of functionality: 2, viscosity at 25° C.: about 32000 cps, Tg: −54° C. |
| urethane oligomer having (meth)acryloxy group 1-3 | CN 8004 (Sartomer Company, Inc.); average degree of functionality: less than 2, viscosity at 60° C.: about 9000 cps, Tg: about −3° C. |
| polyisoprene having methacryloxy group 2-1 | UC-102 (Kuraray Company), average degree of functionality: 2, number average molecular weight: about 17,000, Tg: −60° C. |
| polyisoprene having methacryloxy group 2-2 | UC-203 (Kuraray Company), average degree of functionality: 3, number average molecular weight: about 35,000, Tg: −60° C. |
| liquid polybutadiene 3-1 | Ricon130 (Sartomer Company, Inc.), number average molecular weight: about 2500 |
| (meth)acrylate monomer 4-1 | commercially available isobornyl acrylate |
| (meth)acrylate monomer 4-2 | commercially available hydroxypropyl methacrylate |
| (meth)acrylate monomer 4-3 | commercially available 2-(2-ethoxyethoxy)ethyl acrylate |
| (meth)acrylate monomer 4-4 | commercially available ethylene glycol dicyclopentenyl ether methacrylate |
| UV-photoinitiator 5-1 | 2-hydroxy-2-methyl-1-phenyl-1-propanone (BASF company, Inc.) |
| UV-photoinitiator 5-2 | diphenyl(2,4,6-trimethylbenzoyl)-phosphine oxide (BASF company, Inc.) |
| thermal initiator 6-1 | 1,1-bis(tert-butylperoxy)-3,3,5-trimethyl cyclohexane (J&K Scientific Ltd.) |
| thermal initiator 6-2 | tert-butyl peroxybenzoate |

Other compounds used in the examples are all chemical pure reagents, and are all commercially available.

Example 1 (Inventive)

Adhesive composition 1 was formulated according to the composition in Table 1 and formulating method as stated below:

TABLE 1

| Components | Contents |
|---|---|
| urethane oligomer having (meth)acryloxy group 1-1 | 70 parts by weight |
| (meth)acrylate 4-1 | 10 parts by weight |
| (meth)acrylate 4-2 | 7 parts by weight |
| (meth)acrylate 4-3 | 7 parts by weight |
| UV-photoinitiator 5-1 | 2 parts by weight |
| UV-photoinitiator 5-2 | 1 parts by weight |
| thermal initiator 6-1 | 2 parts by weight |
| thermal initiator 6-2 | 1 parts by weight |

The formulating procedure of the adhesive composition was as follows: Under a condition of darkness, feeding all above components (total: 100 g) into a plastic barrel having a volume of 150 g in the order listed above, mounting a SpeedMixer™ mixer produced by FlackTech Inc. in the barrel, and all the components were mixed and dispersed at a rotation of 2000-2400 rpm for 10 minutes, thus obtaining a transparent adhesive composition 1.

Example 2 (Inventive)

Adhesive composition 2 was formulated according to the composition in Table 2 and method as stated in example 1.

TABLE 2

| Components | Contents |
| --- | --- |
| urethane oligomer having (meth)acryloxy group 1-1 | 70 parts by weight |
| (meth)acrylate 4-1 | 11 parts by weight |
| (meth)acrylate 4-2 | 7 parts by weight |
| (meth)acrylate 4-3 | 7 parts by weight |
| UV-photoinitiator 5-1 | 2 parts by weight |
| UV-photoinitiator 5-2 | 1 parts by weight |
| thermal initiator 6-1 | 2 parts by weight |

Example 3 (Not Inventive)

Adhesive composition 3 was formulated according to the composition in Table 3 and method as stated in example 1.

TABLE 3

| Components | Contents |
| --- | --- |
| urethane oligomer having (meth)acryloxy group 1-1 | 70 parts by weight |
| (meth)acrylate 4-1 | 11 parts by weight |
| (meth)acrylate 4-2 | 8 parts by weight |
| (meth)acrylate 4-3 | 8 parts by weight |
| UV-photoinitiator 5-1 | 1 parts by weight |

Example 4 (Inventive)

Adhesive composition 4 was formulated according to the composition in Table 4 and method as stated in example 1.

TABLE 4

| Components | Contents |
| --- | --- |
| urethane oligomer having (meth)acryloxy group 1-2 | 65 parts by weight |
| urethane oligomer having (meth)acryloxy group 1-3 | 20 parts by weight |
| (meth)acrylate 4-1 | 10 parts by weight |
| (meth)acrylate 4-2 | 7 parts by weight |
| (meth)acrylate 4-3 | 7 parts by weight |
| UV-photoinitiator 5-1 | 2 parts by weight |
| thermal initiator 6-1 | 2 parts by weight |
| thermal initiator 6-2 | 1 parts by weight |

Example 5 (Inventive)

Adhesive composition 5 was formulated according to the composition in Table 5 and method as stated in example 1.

TABLE 5

| Components | Contents |
| --- | --- |
| urethane oligomer having (meth)acryloxy group 1-2 | 65 parts by weight |
| urethane oligomer having (meth)acryloxy group 1-3 | 20 parts by weight |
| (meth)acrylate 4-1 | 10 parts by weight |
| (meth)acrylate 4-2 | 7 parts by weight |
| (meth)acrylate 4-3 | 7 parts by weight |
| UV-photoinitiator 5-1 | 2 parts by weight |
| UV-photoinitiator 5-2 | 1 parts by weight |
| thermal initiator 6-1 | 2 parts by weight |

Example 6 (Inventive)

Adhesive composition 6 was formulated according to the composition in Table 6 and method as stated in example 1.

TABLE 6

| Components | Contents |
| --- | --- |
| polyisoprene having methacryloxy group 2-1 | 30 parts by weight |
| liquid polybutadiene 3-1 | 40 parts by weight |
| (meth)acrylate 4-1 | 12 parts by weight |
| (meth)acrylate 4-2 | 12 parts by weight |
| UV-photoinitiator 5-1 | 2 parts by weight |
| UV-photoinitiator 5-2 | 1 parts by weight |
| thermal initiator 6-1 | 2 parts by weight |
| thermal initiator 6-2 | 1 parts by weight |

Example 7 (Inventive)

Adhesive composition 7 was formulated according to the composition in Table 7 and method as stated in example 1.

TABLE 7

| Components | Contents |
| --- | --- |
| Polyisoprene having methacryloxy group 2-1 | 30 parts by weight |
| liquid polybutadiene 3-1 | 40 parts by weight |
| (meth)acrylate 4-2 | 12 parts by weight |
| (meth)acrylate 4-4 | 12 parts by weight |
| UV-photoinitiator 5-1 | 2 parts by weight |
| UV-photoinitiator 5-2 | 1 parts by weight |
| thermal initiator 6-1 | 2 parts by weight |
| thermal initiator 6-2 | 1 parts by weight |

Example 8 (Not Inventive)

Adhesive composition 8 was formulated according to the composition in Table 8 and method as stated in example 1

TABLE 8

| Components | Contents |
| --- | --- |
| Polyisoprene having methacryloxy group 2-1 | 30 parts by weight |
| polyisoprene having methacryloxy group 2-2 | 10 parts by weight |
| liquid polybutadiene 3-1 | 33 parts by weight |
| (meth)acrylate 4-1 | 12 parts by weight |
| (meth)acrylate 4-2 | 12 parts by weight |
| UV-photoinitiator 5-1 | 2 parts by weight |
| UV-photoinitiator 5-2 | 1 parts by weight |

Example 9 (Inventive)

Adhesive composition 9 was formulated according to the composition in Table 9 and method as stated in example 1.

TABLE 9

| Components | Contents |
| --- | --- |
| polyisoprene having methacryloxy group 2-1 | 50 parts by weight |
| (meth)acrylate 4-1 | 12 parts by weight |
| (meth)acrylate 4-2 | 12 parts by weight |
| (meth)acrylate 4-4 | 20 parts by weight |
| UV-photoinitiator 5-1 | 2 parts by weight |
| UV-photoinitiator 5-2 | 1 parts by weight |
| thermal initiator 6-1 | 2 parts by weight |
| thermal initiator 6-2 | 1 parts by weight |

Example 10 (Inventive)

Adhesive composition 10 was formulated according to the composition in Table 10 and method as stated in example 1.

TABLE 10

| Components | Contents |
| --- | --- |
| polyisoprene having methacryloxy group 2-1 | 45 parts by weight |
| polyisoprene having methacryloxy group 2-2 | 15 parts by weight |
| (meth)acrylate 4-1 | 17 parts by weight |
| (meth)acrylate 4-4 | 17 parts by weight |
| UV-photoinitiator 5-1 | 2 parts by weight |
| UV-photoinitiator 5-2 | 1 parts by weight |
| Thermal initiator 6-1 | 2 parts by weight |
| Thermal initiator 6-2 | 1 parts by weight |

The adhesive compositions 1-10 of Examples 1-10 were tested as mentioned in test 1 to test 5, and the results were showed in Table 11 below:

TABLE 11

| | Example 1 | Example 2 | Example 3 | Example 4 | Example 5 |
| --- | --- | --- | --- | --- | --- |
| test 1 | cured within 30 seconds | cured within 30 seconds | cured within 30 seconds | cured within 30 seconds | cured within 30 seconds |
| test 2 | cured within 1 hour at 80° C. | cured within 2 hours at 90° C. | Could not cured | cured within 1 hour at 80° C. | cured within 2 hours at 90° C. |
| test 3 | >0.6 MPa | >0.6 MPa | >0.6. MPa | >0.4 MPa | >0.4 MPa |
| test 4 | >92% | >92% | >92% | 92% | 92% |
| test 5 | composition cured | composition cured | composition in liquid | composition cured | composition cured |

| | Example 6 | Example 7 | Example 8 | Example 9 | Example 10 |
| --- | --- | --- | --- | --- | --- |
| test 1 | cured within 30 seconds | cured within 30 seconds | cured within 30 seconds | cured within 30 seconds | cured within 30 seconds |
| test 2 | cured within 1 hour at 80° C. | cured within 2 hours at 90° C. | Could not cured | cured within 1 hour at 80° C. | cured within 2 hours at 90° C. |
| test 3 | >0.6 MPa | >0.6 MPa | >0.6. MPa | >0.4 MPa | >0.4 MPa |
| test 4 | >92% | >92% | >92% | 92% | 92% |
| test 5 | composition cured | composition cured | composition in liquid | composition cured | composition cured |

What is claimed is:

1. An optical transparent dual cure adhesive composition, based on the total weight of the adhesive composition, the composition comprises:
   30-60 wt % of polyisoprene having a vinyl group but no (meth)acryloxy group;
   25-45 wt % of (meth)acrylate;
   10-40 wt % of liquid polybutadiene,
   2-3 wt % of UV-photoinitiator, and
   2-3 wt % of thermal initiator selected from tert-butyl peroxybenzoate, 1,1-di(tert-butyl peroxy)-3,3,5-trimethylcyclohexane and mixtures thereof.

2. The composition according to claim 1, wherein
   said polyisoprene has an average degree of functionality of 0.5-3 and a number average molecular weight of 10000-50000 Daltons; and
   said liquid polybutadiene has a number average molecular weight of 1000-30000 Daltons.

3. The composition according to claim 2, wherein said polyisoprene has a number average molecular weight of 12000-40000 Daltons.

4. The composition according to claim 2, wherein said polyisoprene has a number average molecular weight of 15000-35000 Daltons.

5. The composition according to claim 2, wherein said liquid polybutadiene has a number average molecular weight of 1500-25000 Daltons.

6. The composition according to claim 2, wherein said liquid polybutadiene has a number average molecular weight of 2000-20000 Daltons.

7. The composition according to claim 2, wherein said liquid polybutadiene has a number average molecular weight of 3000-10000 Daltons.

8. The composition according to claim 1, wherein said liquid polybutadiene is present in an amount of 20-35 wt %.

9. An optical transparent dual cure adhesive composition, based on the total weight of the adhesive composition, the composition consisting of:
   30-60 wt % of polyisoprene having a vinyl group but no (meth)acryloxy group;
   25-45 wt % of (meth)acrylate;
   10-40 wt % of liquid polybutadiene,
   2-3 wt % of UV-photoinitiator, and
   2-3 wt % of thermal initiator selected from tert-butyl peroxybenzoate, 1,1-di(tert-butyl peroxy)-3,3,5-trimethylcyclohexane and mixtures thereof.

* * * * *

UNITED STATES PATENT AND TRADEMARK OFFICE
CERTIFICATE OF CORRECTION

PATENT NO.        : 9,708,518 B2
APPLICATION NO.   : 14/874915
DATED             : July 18, 2017
INVENTOR(S)       : Rui Zhang and Daoqiang Lu Page 1 of 1

It is certified that error appears in the above-identified patent and that said Letters Patent is hereby corrected as shown below:

In the Specification

Column 2, Line 61: Change "fundional" to -- functional --.

Signed and Sealed this
Fifth Day of June, 2018

Andrei Iancu
*Director of the United States Patent and Trademark Office*